United States Patent
Yu et al.

(10) Patent No.: US 11,423,790 B2
(45) Date of Patent: Aug. 23, 2022

(54) TETHER MANAGEMENT SYSTEMS AND METHODS

(71) Applicant: FLIR Unmanned Aerial Systems ULC, Vancouver (CA)

(72) Inventors: Fei Yu, Waterloo (CA); Richard Cunha, Waterloo (CA); Jerry Mailloux, Wellesley (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 38 days.

(21) Appl. No.: 17/148,500

(22) Filed: Jan. 13, 2021

(65) Prior Publication Data

US 2021/0241636 A1   Aug. 5, 2021

Related U.S. Application Data (60) Provisional application No. 62/963,143, filed on Jan. 19, 2020.

(51) Int. Cl.
*G08G 5/00* (2006.01)

(52) U.S. Cl.
CPC ......... *G08G 5/0069* (2013.01); *G08G 5/0017* (2013.01)

(58) Field of Classification Search
CPC .. G08G 5/0013; G08G 5/0017; G08G 5/0026; G08G 5/0052; G08G 5/0069;
(Continued)

(56) References Cited

U.S. PATENT DOCUMENTS 7,149,611 B2   12/2006   Beck et al.
8,594,862 B2   11/2013   Callou et al.
(Continued)

FOREIGN PATENT DOCUMENTS

CN   103332296   10/2013
CN   105223958   1/2016
(Continued)

OTHER PUBLICATIONS

Elistair Report Summary, Periodic Reporting for period 1—"Elistair (Bringing unlimited autonomy to Civilian Drones: PULSE, an Intelligent Tethered Power Supply.)", Report Period May 1, 2015 to Oct. 31, 2015, dated Jul. 5, 2016, pp. 1-3.
(Continued)

*Primary Examiner* — Andrew W Bee
(74) *Attorney, Agent, or Firm* — Haynes and Boone, LLP (57) ABSTRACT

Unmanned aircraft systems (UASs) and related techniques are provided to improve the operation of unmanned mobile sensor or survey platforms. A tether management system includes a logic device configured to communicate with a communication module and an orientation sensor coupled to a tethered unmanned aerial vehicle (UAV), wherein the communication module is configured to establish a communication link with a base station associated with the tethered UAV, the orientation sensor is configured to provide headings of the tethered UAV as it maneuvers within a survey area. The logic device is configured to determine an accumulated twist of a tether coupled between the base station and the tethered UAV and generate a tether damage warning notification based, at least in part, on the determined accumulated twist and a maximum allowable accumulated twist associated with the tether coupled between the base station and the tethered UAV.

20 Claims, 7 Drawing Sheets

(58) Field of Classification Search
CPC .......... B64C 39/022; B64C 39/024; B64C 2201/148; B64F 3/00; B64F 3/02; G05D 1/0866; F05B 2240/917
See application file for complete search history.

(56) References Cited

U.S. PATENT DOCUMENTS

| | | |
|---|---|---|
| 9,016,617 B2 | 4/2015 | Wang et al. |
| 9,216,818 B1 | 12/2015 | Wang |
| 9,277,130 B2 | 3/2016 | Wang et al. |
| 9,284,049 B1 | 3/2016 | Wang et al. |
| 9,446,858 B2 | 9/2016 | Hess |
| 9,592,744 B2 | 3/2017 | Zhao |
| 9,592,911 B2 | 3/2017 | Liu et al. |
| 9,609,288 B1 | 3/2017 | Richman et al. |
| 9,650,157 B2 | 5/2017 | GilroySmith |
| 9,725,169 B2 | 8/2017 | Lemus Martin et al. |
| 9,764,838 B2 | 9/2017 | Priest |
| 9,776,200 B2 | 10/2017 | Busby et al. |
| 9,859,972 B2 | 1/2018 | Jalali |
| 9,902,495 B2 | 2/2018 | Phan et al. |
| 9,919,797 B2 | 3/2018 | Chan et al. |
| 9,988,140 B2 | 6/2018 | Priest |
| 10,011,352 B1 | 7/2018 | Dahlstrom |
| 10,228,245 B2 | 3/2019 | Babel et al. |
| 2003/0164794 A1 | 9/2003 | Haynes et al. |
| 2006/0183487 A1 | 8/2006 | Allen et al. |
| 2010/0295303 A1 | 11/2010 | Lind et al. |
| 2013/0233964 A1 | 9/2013 | Woodworth et al. |
| 2014/0263852 A1 | 9/2014 | Walker et al. |
| 2015/0041598 A1 | 2/2015 | Nugent et al. |
| 2015/0158586 A1* | 6/2015 | Hachtmann .......... H01R 39/64 244/110 C |
| 2015/0180186 A1* | 6/2015 | Vander Lind ......... B64C 39/022 290/55 |
| 2015/0183529 A1* | 7/2015 | Hachtmann .......... B66D 1/30 254/266 |
| 2015/0191259 A1 | 7/2015 | Giovannini et al. |
| 2015/0312774 A1 | 10/2015 | Lau |
| 2015/0375874 A1* | 12/2015 | Patten .......... F03D 7/02 244/110 C |
| 2016/0005159 A1* | 1/2016 | Hallamask .......... G06T 7/70 701/300 |
| 2016/0059963 A1 | 3/2016 | Burgess et al. |
| 2016/0073271 A1 | 3/2016 | Schultz et al. |
| 2016/0363659 A1 | 12/2016 | Mindell et al. |
| 2017/0158338 A1 | 6/2017 | Sweeny et al. |
| 2018/0050798 A1 | 2/2018 | Kapuria |
| 2018/0245365 A1 | 8/2018 | Wankewycz |
| 2018/0292844 A1 | 10/2018 | Kosseifi et al. |
| 2019/0154003 A1 | 5/2019 | Nordstrom |
| 2020/0122830 A1 | 4/2020 | Anderson et al. |
| 2021/0058143 A1 | 2/2021 | Muren et al. |
| 2021/0241635 A1 | 8/2021 | Tribou et al. |

FOREIGN PATENT DOCUMENTS

| | | |
|---|---|---|
| CN | 105752337 | 7/2016 |
| CN | 105932737 | 9/2016 |
| CN | 107196696 | 9/2017 |
| CN | 206807060 | 12/2017 |
| CN | 107651212 | 2/2018 |
| CN | 207173951 | 4/2018 |
| CN | 108268079 | 7/2018 |
| EP | 2228301 | 9/2010 |
| KR | 101816803 | 1/2018 |
| KR | 20180031622 | 3/2018 |
| RU | 2441809 | 2/2012 |
| RU | 154874 | 9/2015 |
| RU | 169165 | 3/2017 |
| WO | WO 2002/061971 | 8/2002 |
| WO | WO 2007/078422 | 7/2007 |
| WO | WO 2007/141795 | 12/2007 |
| WO | WO 2011/032051 | 3/2011 |
| WO | WO 2013/150442 | 10/2013 |
| WO | WO 2015/102700 | 7/2015 |
| WO | WO 2015/138217 | 9/2015 |
| WO | WO 2017/117608 | 7/2017 |
| WO | WO 2018/034578 | 2/2018 |

OTHER PUBLICATIONS

Elistair, "A Comparison of Persistent Aerial Surveillance Solutions", (htlps://elistair.com/a-comparison-0f-persistent-Aerial-surveillance-solutions/) Dated Jun. 27, 2016. p. 1 of 1.

Tognon et al. "Control of Motion and Internal Stresses for a Chain of Two Underactuated Aerial Robots", 2015 European Control Conference (ECG), EUCA, Jul. 15, 2015, pp. 1620-1625, XP032814269, [retrieved on Nov. 16, 2015].

* cited by examiner

TETHER MANAGEMENT SYSTEMS AND METHODS

CROSS-REFERENCE TO RELATED APPLICATIONS

This application claims the benefit of and priority to U.S. Provisional Patent Application No. 62/963,143 filed Jan. 19, 2020 and entitled "TETHER MANAGEMENT SYSTEMS AND METHODS," which is incorporated herein by reference in its entirety.

This application is related to International Patent Application No. PCT/US2019/025458 filed Apr. 2, 2019 and entitled "RADIO LINK COVERAGE MAP AND LOSS MITIGATION SYSTEMS AND METHODS," which is hereby incorporated by reference in its entirety. PCT/US2019/025458 claims the benefit of U.S. Provisional Patent Application No. 62/664,719 filed Apr. 30, 2018 and entitled "RADIO LINK COVERAGE MAP AND LOSS MITIGATION SYSTEMS AND METHODS" which is hereby incorporated by reference in its entirety.

This application is related to U.S. patent application Ser. No. 16/088,040 filed Sep. 24, 2018 and entitled "PERSISTENT AERIAL RECONNAISSANCE AND COMMUNICATION SYSTEM," which is hereby incorporated by reference in its entirety. U.S. patent application Ser. No. 16/088,040 is a 35 U.S.C. 371 national stage filing of PCT Patent Application No. PCT/US2017/024152 filed Mar. 24, 2017 and entitled "PERSISTENT AERIAL RECONNAISSANCE AND COMMUNICATION SYSTEM," which is hereby incorporated by reference in its entirety. PCT/US2017/024152 claims the benefit of U.S. Provisional patent Application No. 62/312,887 filed Mar. 24, 2016, U.S. Provisional Patent Application No. 62/315,873 filed Mar. 31, 2016, U.S. Provisional Patent Application No. 62/321,292 filed on Apr. 12, 2016, U.S. Provisional Patent Application No. 62/420,548 filed on Nov. 10, 2016, U.S. Provisional patent Application No. 62/463,536 filed on Feb. 24, 2017, all of which are hereby incorporated by reference in their entirety.

TECHNICAL FIELD

The present invention relates generally to unmanned sensor platforms and, more particularly, to systems and methods for tether management for unmanned aerial vehicles.

BACKGROUND

Modern unmanned sensor platforms, such as unmanned aerial vehicles (UAVs), remotely operated underwater vehicles (ROVs), unmanned (water) surface vehicles (USVs), and unmanned ground vehicles (UGVs) are able to operate over long distances and in all environments; rural, urban, and even underwater. Operation of such platforms typically includes real-time data transmissions between the unmanned sensor platform and a base station, which often includes a display to efficiently convey telemetry, imagery, and other sensor data captured by the platform to an operator. The operator, or a system incorporating such platforms, is often required to pilot or otherwise control or monitor an unmanned sensor platform throughout an entire mission relying solely on received data from the unmanned sensor platform. As such, non-automated or unreliably automated aspects related to safe and precise control of the unmanned sensor platform can significantly reduce the operational flexibility of the platform and/or its constituent system.

Thus, there is a need in the art for methodologies to automate or more-reliably automate control of unmanned sensor platforms and increase the operational flexibility of such systems.

SUMMARY

Tether management systems and related techniques are provided to improve the operation of unmanned aerial vehicles (UAVs) and/or unmanned aircraft systems (UASs) incorporating one or more such UAVs. One or more embodiments of the described tether management systems may advantageously include a communication module to establish one or more wired and/or wireless communication links between a ground station and a UAV of the UAS, an orientation sensor configured to provide headings of the tethered UAV as it maneuvers within a survey area, and a controller to control operation of the communication module, the orientation sensor, and/or the mobile platform, and one or more additional sensors to measure and provide sensor data corresponding to maneuvering and/or other operation of the mobile platform. In various embodiments, such additional sensors may include a remote sensor system configured to capture sensor data of a survey area from which a two and/or three dimensional spatial map of the survey area may be generated. For example, the mapping system may include one or more visible spectrum and/or infrared cameras and/or other remote sensor systems coupled to the UAV.

In one embodiment, a system includes a logic device configured to communicate with a communication module and an orientation sensor coupled to a tethered UAV, wherein the communication module is configured to establish a communication link with a base station associated with the tethered UAV, the orientation sensor is configured to provide headings of the tethered UAV as it maneuvers within a survey area. The logic device may be configured to receive heading data from the orientation sensor corresponding to one or more positions of the tethered UAV within the survey area; determine an accumulated twist of a tether coupled between the base station and the tethered UAV, wherein the accumulated twist of the tether is based, at least in part, on the received heading data; and generate a tether damage warning notification based, at least in part, on the determined accumulated twist and a maximum allowable accumulated twist associated with the tether coupled between the base station and the tethered UAV.

In another embodiment, a method includes receiving heading data from the orientation sensor coupled to a tethered UAV configured to provide headings of the tethered UAV as it maneuvers within a survey area, wherein the heading data corresponds to one or more positions of the tethered UAV within a survey area; determining an accumulated twist of a tether coupled between a base station and the tethered UAV, wherein the accumulated twist of the tether is based, at least in part, on the received heading data; and generating a tether damage warning notification based, at least in part, on the determined accumulated twist and a maximum allowable accumulated twist associated with the tether coupled between the base station and the tethered UAV.

The scope of the invention is defined by the claims, which are incorporated into this section by reference. A more complete understanding of embodiments of the present invention will be afforded to those skilled in the art, as well

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Tether management systems and related techniques are provided to improve the operational flexibility and reliability of unmanned aircraft systems (UASs) including unmanned sensor platforms, such as unmanned aerial vehicles (UAVs). UAVs, colloquially referred to as drones, gain prolonged flight time when connected to a power source through a tether. However, conventional tethers typically introduce some undesirable side effects such as limited flight range and extra weight. In some tethered flight scenarios, the UAV could spin many times for purposes like tracking a target. As a consequence, the tension accumulated by the resulting twists could eventually damage the tether. As such, it can be necessary to untwist the tether by counterrotating (e.g., counter-yawing) the aircraft to eliminate or at least reduce the accumulated twists. Manually counterrotating the UAV many times can be a frustrating task for an operator of a UAS including a tethered UAV. Embodiments described herein counteract this frustration by: tracking accumulated twists in the tether and informing the operator of the accumulated twists (e.g., or yaw of the UAV); alerting the operator when the tether has been twisted up to and/or beyond a preselected maximum allowable accumulated twists; and/or autopiloting the UAV to untwist the tether such that the accumulated twists are less than the maximum allowable accumulated twists.

A tether management system may advantageously include a communication module configured to establish a communication link with a base station associated with a tethered UAV, a logic device configured to communicate with a communication module and an orientation sensor coupled to a tethered UAV, and one or more additional sensors to measure and provide sensor data corresponding to maneuvering and/or other operation of the mobile platform. In various embodiments, such additional sensors may include a remote sensor system configured to capture sensor data of a survey area from which a two and/or three dimensional spatial map of the survey area may be generated. For example, the mapping system may include one or more visible spectrum and/or infrared cameras and/or other remote sensor systems coupled to the UAV.

Figure 1:
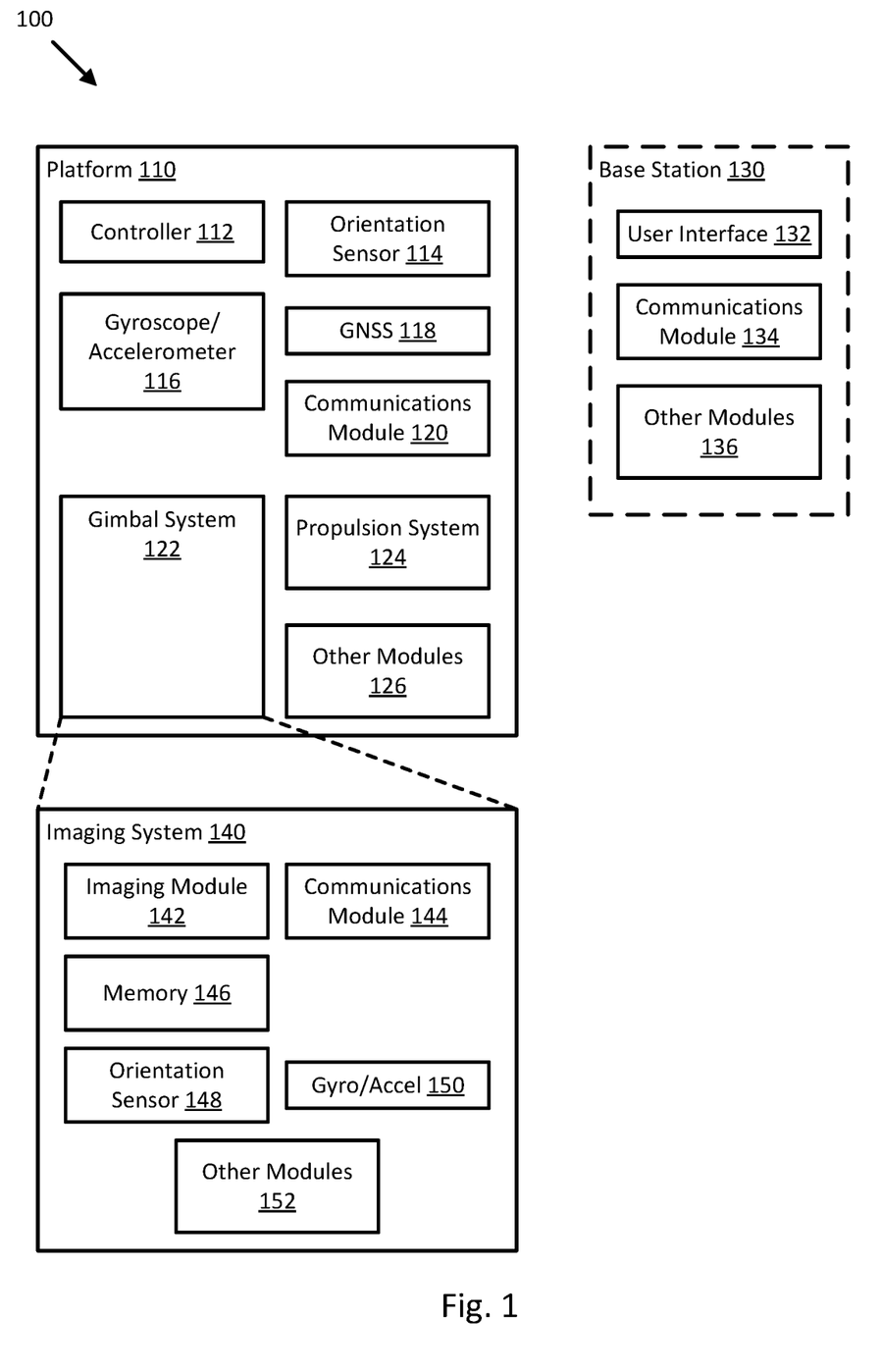
FIG. 1 illustrates a diagram of an unmanned aircraft system (UAS) in accordance with an embodiment of the disclosure.

FIG. 1 illustrates a block diagram of UAS 100 in accordance with an embodiment of the disclosure. In some embodiments, system 100 may be configured to fly over a scene, through a structure, or approach a target and image or sense the scene, structure, or target, or portions thereof, using gimbal system 122 to aim imaging system/sensor payload 140 at the scene, structure, or target, or portions thereof. Resulting imagery and/or other sensor data may be processed (e.g., by sensor payload 140, platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of platform 110 and/or sensor payload 140, as described herein, such as controlling gimbal system 122 to aim sensor payload 140 towards a particular direction or controlling propulsion system 124 to move platform 110 to a desired position in a scene or structure or relative to a target.

In the embodiment shown in FIG. 1, UAS 100 includes platform 110, optional base station 130, and at least one imaging system/sensor payload 140. Platform 110 may be a mobile platform configured to move or fly and position and/or aim sensor payload 140 (e.g., relative to a designated or detected target). As shown in FIG. 1, platform 110 may include one or more of a controller 112, an orientation sensor 114, a gyroscope/accelerometer 116, a global navigation satellite system (GNSS) 118, a communications module 120, a gimbal system 122, a propulsion system 124, and other modules 126. Operation of platform 110 may be substantially autonomous and/or partially or completely controlled by optional base station 130, which may include one or more of a user interface 132, a communications module 134, and other modules 136. In other embodiments, platform 110 may include one or more of the elements of base station 130, such as with various types of manned aircraft, terrestrial vehicles, and/or surface or subsurface watercraft. Sensor payload 140 may be physically coupled to platform 110 and be configured to capture sensor data (e.g., visible spectrum images, infrared images, narrow aperture radar data, and/or other sensor data) of a target position, area, and/or object(s) as selected and/or framed by operation of platform 110 and/or base station 130. In some embodiments, one or more of the elements of system 100 may be implemented in a combined housing or structure that can be coupled to or within platform 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of platform 110 and/or other elements of system 100, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of platform 110, for example, or distributed as multiple logic devices within platform 110, base station 130, and/or sensor payload 140.

In some embodiments, controller 112 may be configured to substantially continuously monitor and/or store the status of and/or sensor data provided by one or more elements of platform 110, sensor payload 140, and/or base station 130, such as the position and/or orientation of platform 110, sensor payload 140, and/or base station 130, for example, and the status of a communication link established between platform 110, sensor payload 140, and/or base station 130 (e.g., including packet loss of transmitted and received data between elements of system 100, such as with digital communication links). In particular, packet loss is traditionally estimated as a percentage of packets lost vs packets sent to a designated target. However, controller 112 may also be configured to categorize packet loss, such as a simplified scaling methodology that may be used to categorize the amount of packet loss acceptable for a specific use of platform 110 and/or sensor payload 140. Regardless, such communication links may be configured to be established and then transmit data between elements of system 100 substantially continuously throughout operation of system 100, where such data includes various types of sensor data, control parameters, and/or other data.

Orientation sensor 114 may be implemented as one or more of a compass, float, accelerometer, and/or other device capable of measuring an orientation of platform 110 (e.g., magnitude and direction of roll, pitch, and/or yaw, relative to one or more reference orientations such as gravity and/or Magnetic North), gimbal system 122, imaging system/sensor payload 140, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of platform 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of platform 110 (e.g., or an element of platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Communications module 120 may be implemented as any wired and/or wireless communications module configured to transmit and receive analog and/or digital signals between elements of system 100. For example, communications module 120 may be configured to receive flight control signals and/or data from base station 130 and provide them to controller 112 and/or propulsion system 124. In other embodiments, communications module 120 may be configured to receive images and/or other sensor information (e.g., visible spectrum and/or infrared still images or video images) from sensor payload 140 and relay the sensor data to controller 112 and/or base station 130. In some embodiments, communications module 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications.

In some embodiments, communications module 120 may be configured to monitor the status of a communication link established between platform 110, sensor payload 140, and/or base station 130 (e.g., including packet loss of transmitted and received data between elements of system 100, such as with digital communication links). Such status information may be provided to controller 112, for example, or transmitted to other elements of system 100 for monitoring, storage, or further processing, as described herein. In particular, communications module 120 may be configured to monitor packet loss of communications between platform 110 and base station 130 and/or categorize such packet loss according to an acceptable level of packet loss for a particular use or application associated with operation and/or a status of platform 110 and/or other elements of system 100. Regardless, communication links established by communication module 120 may be configured to transmit data between elements of system 100 substantially continuously throughout operation of system 100, where such data includes various types of sensor data, control parameters, and/or other data, as described herein.

In some embodiments, gimbal system 122 may be implemented as an actuated gimbal mount, for example, that may be controlled by controller 112 to stabilize sensor payload 140 relative to a target or to aim sensor payload 140 according to a desired direction and/or relative position. As such, gimbal system 122 may be configured to provide a relative orientation of sensor payload 140 (e.g., relative to an orientation of platform 110) to controller 112 and/or communications module 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of articulated sensor/sensor payload 140. In further embodiments, gimbal system 122 may be configured to couple to a laser pointer, range finder, and/or other device, for example, to support, stabilize, power, and/or aim multiple devices (e.g., sensor payload 140 and one or more other devices) substantially simultaneously.

Propulsion system 124 may be implemented as one or more propellers, turbines, or other thrust-based propulsion systems, and/or other types of propulsion systems that can be used to provide motive force and/or lift to platform 110 and/or to steer platform 110. In some embodiments, propulsion system 124 may include multiple propellers (e.g., a tri, quad, hex, oct, or other type "copter") that can be controlled (e.g., by controller 112) to provide lift and motion for platform 110 and to provide an orientation for platform 110. In other embodiments, propulsion system 110 may be configured primarily to provide thrust while other structures of platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices, for instance, and may be used to provide additional environmental information related to operation of platform 110, for example. In some embodiments, other modules 126 may include a humidity sensor, a wind and/or water temperature sensor, a barometer (e.g., a flight barometer), an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of platform 110 and/or system 100.

In some embodiments, other modules 126 may include one or more actuated and/or articulated devices (e.g., multi-spectrum active illuminators, visible and/or IR cameras, radars, sonars, and/or other actuated devices) coupled to platform 110, where each actuated device includes one or more actuators adapted to adjust an orientation of the device, relative to platform 110, in response to one or more control signals (e.g., provided by controller 112). In particular, other modules 126 may include a stereo vision system configured to provide image data that may be used to calculate or estimate a position of platform 110, for example, or to calculate or estimate a relative position of a navigational hazard in proximity to platform 110. In various embodiments, controller 130 may be configured to use such proximity and/or position information to help safely pilot platform 110 and/or monitor communication link quality, as described herein. One or more such cameras/vision systems (e.g., other modules 126) may be used as a position sensor and configured to provide a position of platform 110 via visual odometry, simultaneous localization and mapping (SLAM), and/or other techniques, as a supplement and/or alternative to GNSS 118, such as when GNSS signals are effective blocked or jammed by walls, buildings, and/or environmental electromagnetic noise.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of platform 110 and/or other elements of system 100. For example, user interface 132 may be adapted to display a time series of positions, headings, and/or orientations of platform 110 and/or other elements of system 100 overlaid on a geographical map, which may include one or more graphs indicating a corresponding time series of actuator control signals, sensor information, and/or other sensor and/or control signals.

In some embodiments, user interface 132 may be adapted to accept user input including a user-defined target heading, waypoint, route, and/or orientation for an element of system 100, for example, and to generate control signals to cause platform 110 to move according to the target heading, route, and/or orientation, or to aim sensor payload 140 accordingly. In other embodiments, user interface 132 may be adapted to accept user input modifying a control loop parameter of controller 112, for example.

In further embodiments, user interface 132 may be adapted to accept user input including a user-defined target attitude, orientation, and/or position for an actuated or articulated device (e.g., sensor payload 140) associated with platform 110, for example, and to generate control signals for adjusting an orientation and/or position of the actuated device according to the target attitude, orientation, and/or position. Such control signals may be transmitted to controller 112 (e.g., using communications modules 134 and 120), which may then control platform 110 accordingly.

Communications module 134 may be implemented as any wired and/or wireless communications module configured to transmit and receive analog and/or digital signals between elements of system 100. For example, communications module 134 may be configured to transmit flight control signals from user interface 132 to communications module 120 or 144. In other embodiments, communications module 134 may be configured to receive sensor data (e.g., visible spectrum and/or infrared still images or video images, or other sensor data) from sensor payload 140. In some embodiments, communications module 134 may be configured to support spread spectrum transmissions, for example, and/or multiple simultaneous communications channels between elements of system 100. In various embodiments, communications module 134 may be configured to monitor the status of a communication link established between base station 130, sensor payload 140, and/or platform 110 (e.g., including packet loss of transmitted and received data between elements of system 100, such as with digital communication links), as described herein. Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer (e.g., a demark barometer), a radar system, a visible spectrum camera, an infrared camera, a GNSS, and/or other environmental sensors providing measurements and/or other sensor signals that can be displayed to a user and/or used by other devices of system 100 (e.g., controller 112) to provide operational control of platform 110 and/or system 100 or to process sensor data to compensate for environmental conditions, such as an water content in the atmosphere approximately at the same altitude and/or within the same area as platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In embodiments where imaging system/sensor payload 140 is implemented as an imaging device, imaging system/sensor payload 140 may include imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to controller 112) that can be configured to process imagery captured by detector elements of imaging module 142 before providing the imagery to memory 146 or communications module 144. More generally, imaging module 142 may be configured to perform any of the operations or methods described herein, at least in part, or in combination with controller 112 and/or user interface 132.

In some embodiments, sensor payload 140 may be implemented with a second or additional imaging modules similar to imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communications module 144 of sensor payload 140 may be implemented as any wired and/or wireless communications module configured to transmit and receive analog and/or digital signals between elements of system 100. For example, communications module 144 may be configured to transmit infrared images from imaging module 142 to communications module 120 or 134. In other embodiments, communications module 144 may be configured to receive control signals (e.g., control signals directing capture, focus, selective filtering, and/or other operation of sensor payload 140) from controller 112 and/or user interface 132. In some embodiments, communications module 144 may be configured to support spread spectrum transmissions, for example, and/or multiple simultaneous communications channels between elements of system 100. In various embodiments, communications module 144 may be configured to monitor the status of a communication link established between sensor payload 140, base station 130, and/or platform 110 (e.g., including packet loss of transmitted and received data between elements of system 100, such as with digital communication links), as described herein. Such status information may be provided to imaging module 142, for example, or transmitted to other elements of system 100 for monitoring, storage, or further processing, as described herein.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of sensor payload 140 may be implemented similar to orientation sensor 114 or gyroscope/accelerometer 116, and/or any other device capable of measuring an orientation of sensor payload 140, imaging module 142, and/or other elements of sensor payload 140 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer (e.g., angular motion sensor) 150 of sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of sensor payload 140 and/or various elements of sensor payload 140 and providing such measurements as sensor signals that may be communicated to various devices of system 100.

Other modules 152 of sensor payload 140 may include other and/or additional sensors, actuators, communications modules/nodes, cooled or uncooled optical filters, and/or user interface devices used to provide additional environmental information associated with sensor payload 140, for example. In some embodiments, other modules 152 may include a humidity sensor, a wind and/or water temperature sensor, a barometer (e.g., a payload barometer), a radar system, a visible spectrum camera, an infrared camera, a GNSS, and/or other environmental sensors providing measurements and/or other sensor signals that can be displayed to a user and/or used by imaging module 142 or other devices of system 100 (e.g., controller 112) to provide operational control of platform 110 and/or system 100 or to process imagery to compensate for environmental conditions.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for platform 110, using one or more power leads. Such power leads may also be used to support one or more communication techniques between elements of system 100.

Figure 2:
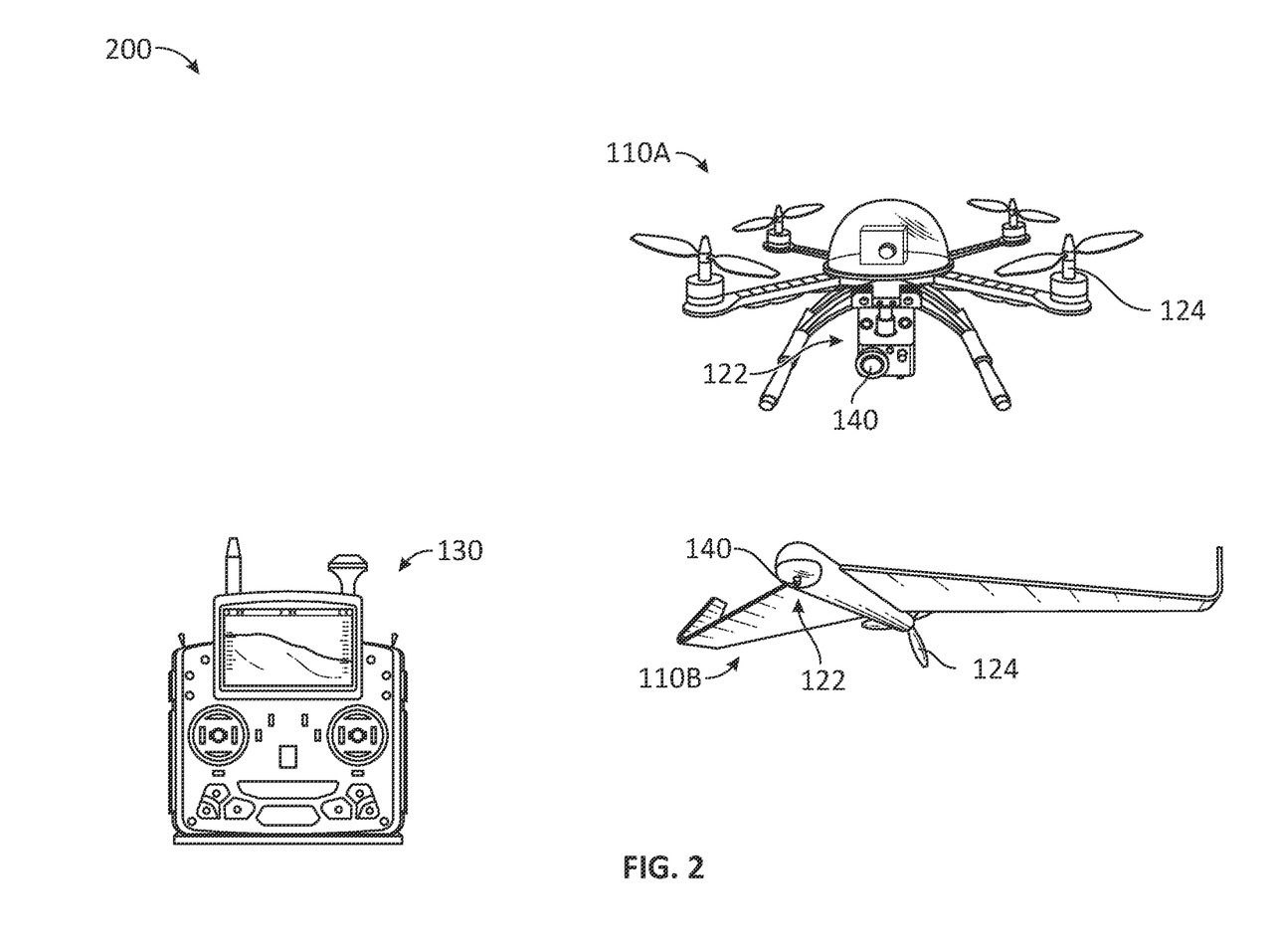
FIG. 2 illustrates a diagram of mobile platforms (UAVs) of a UAS in accordance with an embodiment of the disclosure.

FIG. 2 illustrates a diagram of mobile platforms (UAVs) 110A and 110B of UAS 200 including imaging systems/sensor payloads 140 and associated gimbal systems 122 in accordance with an embodiment of the disclosure. In the embodiment shown in FIG. 2, UAS 200 includes base station 130, UAV 110A with articulated imaging system/sensor payload 140 and gimbal system 122, and UAV 110B with articulated imaging system/sensor payload 140 and gimbal system 122, where base station 130 may be configured to control motion, position, and/or orientation of UAV 110A, UAV 110B, and/or sensor payloads 140.

Many UAVs are designed to fly or hover during their reconnaissance or observation missions while powered by an onboard battery that is required to supply power for propulsion, onboard sensors, and other electronics. The battery life therefore provides a maximum mission length for the UAV. Other UAVs may be configured to be powered via a microfilament deployed from a ground location during their operation thereby extending mission length while restricting the mission flight area in most cases based on the length of the filament. Embodiments described herein may include controlled operation of tethered UAVs with which power, control, and communication signals are transmitted to the UAV. The control station (e.g., base station 130) and UAV include power management systems and control circuits to control takeoff, flight operation, and landing of the UAV. One or more controllers located with the control station, on the UAV or connected by a communications network are configured to execute instructions to operate the system. In one embodiment, a UAV may draw power from remote sources (via tether), from on-board batteries, or from both, as required by operator command or by autonomous control. This ability allows, among other features, a ground or water based UAV to have a power source for safe, controlled landings upon interruption of a tethered power source.

Various embodiments of a UAS, as described herein, include a tether management system having a relatively high tether deployment and retrieval rate. A static assembly can be used on which the tether can be positioned for deployment and retrieval. A moveable actuator may contact the tether to separate the tether from the static assembly during deployment or retrieval in response to commands from a control system that responds to both manual and stored instructions to coordinate tether management with UAV flight control functions.

In some embodiments, a UAS incorporating a tethered UAV may be referred to as a Persistent Aerial Reconnaissance and Communication (PARC) System that offers extended flight time for the UAV through the use of microfilament, which may be implemented by a pair of threadlike wires that can transmit over a kilowatt of power to the UAV while also enabling transmission of bi-directional control and or sensor data, including high-definition video. A PARC system may be rapidly deployed as a low-maintenance UAV based UAS that allows cameras, radios, or other payloads to remain in operation for long durations. A PARC system may be designed to be intuitively simple to launch/land, and a small logistics footprint may make the system appropriate for austere environments. A PARC system may require minimal training for operations and maintenance. A PARC system may be designed for quick and simplified deployment to minimize operator management while maximizing capability provided in terms of communications extension, force protection, persistent stare, and tactical intelligence.

Figure 3A:
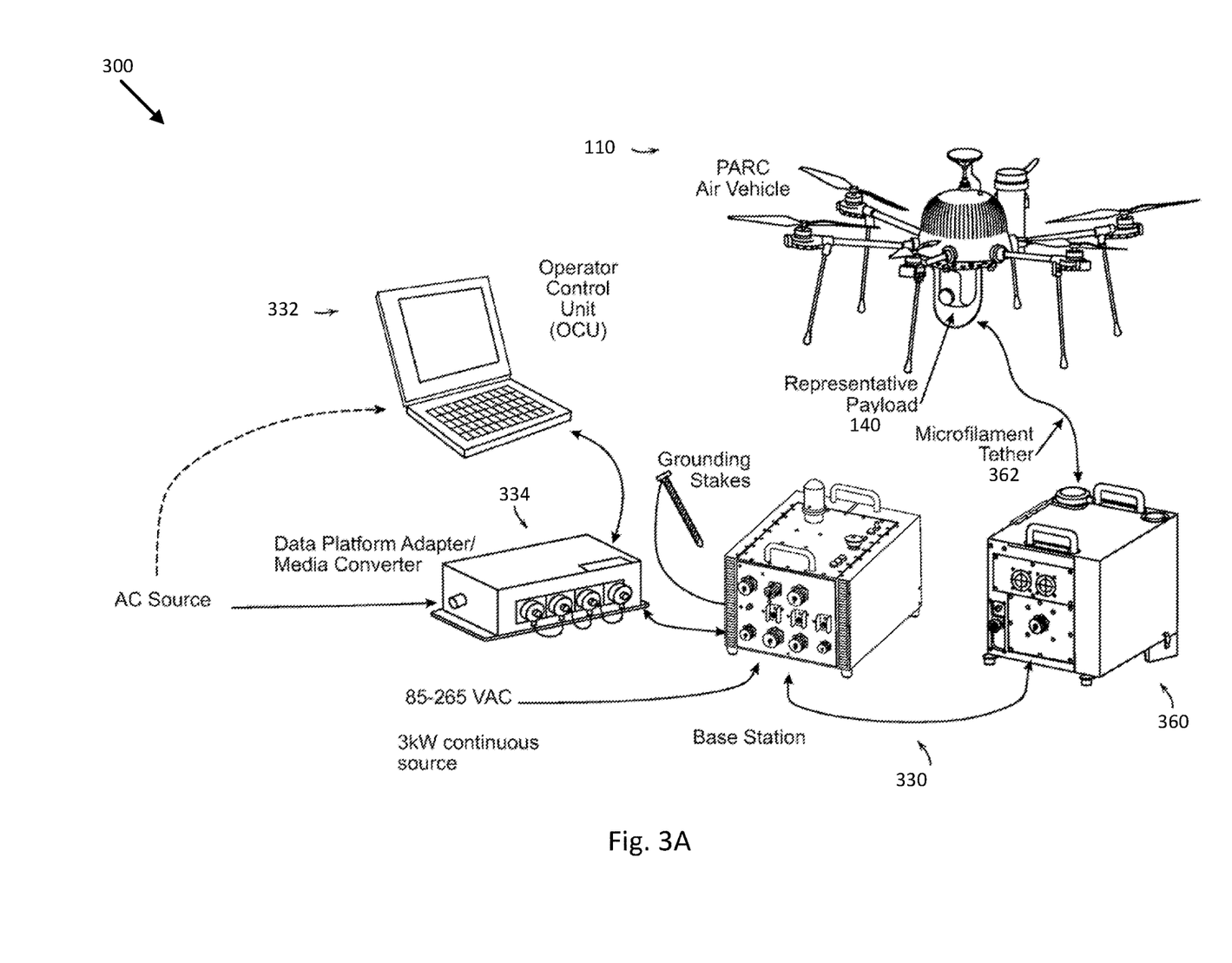
FIG. 3A illustrates a diagram of a UAS including a tethered UAV in accordance with an embodiment of the disclosure.

FIG. 3A illustrates a diagram of a UAS 300 including a tethered UAV 110 in accordance with an embodiment of the disclosure. In some embodiments, UAS 300 may be implemented as a PARC system. UAS 300 includes tethered UAV 110 equipped with a payload 140, a tether management system 360, and a base station 330. UAS 300 may also include a data platform adapter/media converter (DPA/MC) 334 that is coupled to an operator control unit (OCU) 332. Payload 140 may be a camera, radar, or other type of surveillance, communication, or other sensor required by a particular application of the PARC system. In general, system 300 may be an embodiment of system 100 of FIG. 1, where each of base station 330, OCU 332, DPA/MC 334, and/or tether management system 360 may be elements of base station 130 (e.g., and/or other modules 136) of system 100.

Tether management system 360 may be a ground based component that includes a spool assembly that houses a tether spool assembly, which may be a cylindrical hub that holds a pre-wound amount of micro-filament tether to be attached to UAV 110. For example, in one embodiment, the spool assembly may hold 167.6 meters (550 feet) of microfilament tether. In one embodiment, the micro-filament tether may be Kevlar-jacketed twisted copper pair with insulation that provides both a power link and a communication link between tether management system 360 and UAV 110. Base station 330 may be connected to tether management system 360. Base station 330 may include an assembly that houses an AC power input and high voltage conversion electronics in an environmentally sealed enclosure. Base station 330 may also include a high voltage output port to supply high voltage to tether management system 360, which delivers the high voltage via the microfilament to UAV 110. A data platform adapter/media converter (DPA/MC) 334 may serve the function of connecting OCU 332 to base station 330 while also providing electrical shock hazard isolation. DPA/MC 334 may include an optical port to connect to base station 330 via a fiber optic cable and may also include an Ethernet port to connect to OCU 332. OCU 332 may be a ruggedized laptop or other computing device equipped with and able to execute an OCU application enabling control of UAV 110. Further details regarding the operation of tethered and untethered vehicles can be found in U.S. Pat. Nos. 7,510,142 and 7,631,834, the entire contents of which are incorporated herein by reference.

Figure 3B:
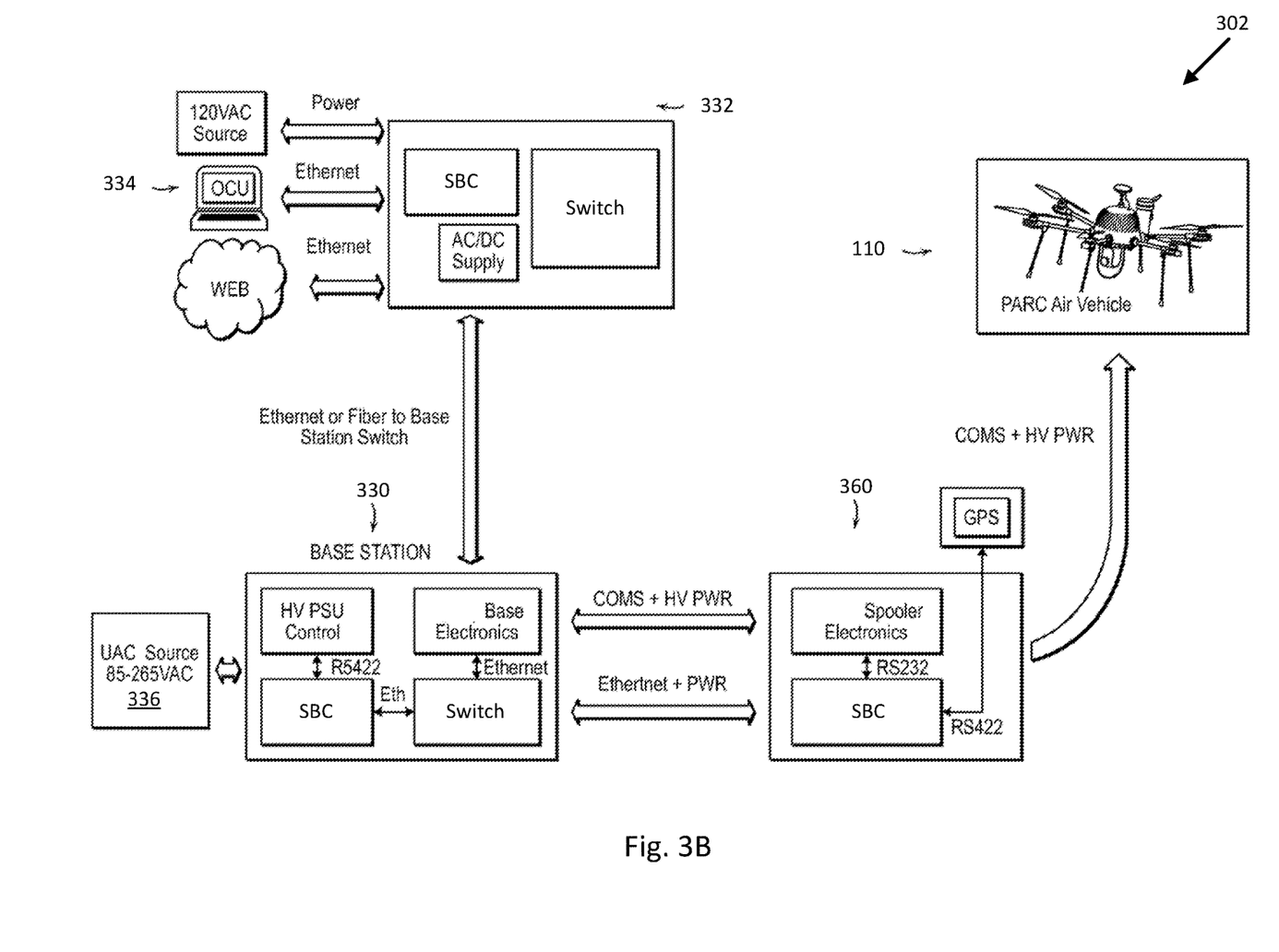
FIG. 3B illustrates a diagram of communication and power interconnections for a UAS including a tethered UAV in accordance with an embodiment of the disclosure.

FIG. 3B illustrates a diagram of communication and power interconnections for UAS 300 in accordance with an embodiment of the disclosure. As shown in FIG. 3B, base station 330 may convert power (e.g., provided by source 336) to high voltage power and provide high voltage power to tether management system 360. Base station 330 may also provide a communication link over Ethernet and low voltage power to tether management system 360. Tether management system 360 may provide the high voltage power over the microfilament tether to UAV 110 for use for energy intensive operations such as radar sensing and propulsion during flight operations. As noted above, the microfilament may also provide a communication pathway used to communicate with UAV 110 by an operator of OCU 332 and/or UAS 300. DPA/MC 334 may communicate with base station 330 over an optical fiber and communicate with OCU 332 over an Ethernet connection.

As noted herein, a UAS incorporating a tethered UAV typically includes: the UAV, which can carry various sensor payloads; a tether for power and/or data transmissions; and a base station and/or tether management system, which usually includes a winch to reel/extend the tether and provides for transfer of external power or generation of power for delivery to the UAV via the tether. It is very common that a UAV yaws for mission purposes during flight. A tethered UAV can typically fly much longer than an untethered UAV, and so a tethered UAV may accumulate sufficient yaw during a flight lasting several hours or days to accumulate a significant number of twists (e.g., complete/ 360 degree yaw rotations) in a single direction (e.g., clockwise may be positive twists, counterclockwise may be negative twists). If most of the twists are in one direction rather than balanced in both directions, the accumulated twist in the tether cable is likely to cause damage, such as breaking tether interface components and/or reducing the reliable life of the tether due to mechanical fatigue. Regardless of whether the base station is placed on the ground or is mounted to a moving vehicle, due to its relatively large weight, rotating the base station/tether management system to untwist the tether is often difficult, and adding a mechanism to rotate the winch introduces significant complexity to the tether management system and/or require a completely new mechanical design. Rotating the other end of the tether, the UAV, is therefore much more desirable.

Figure 4:
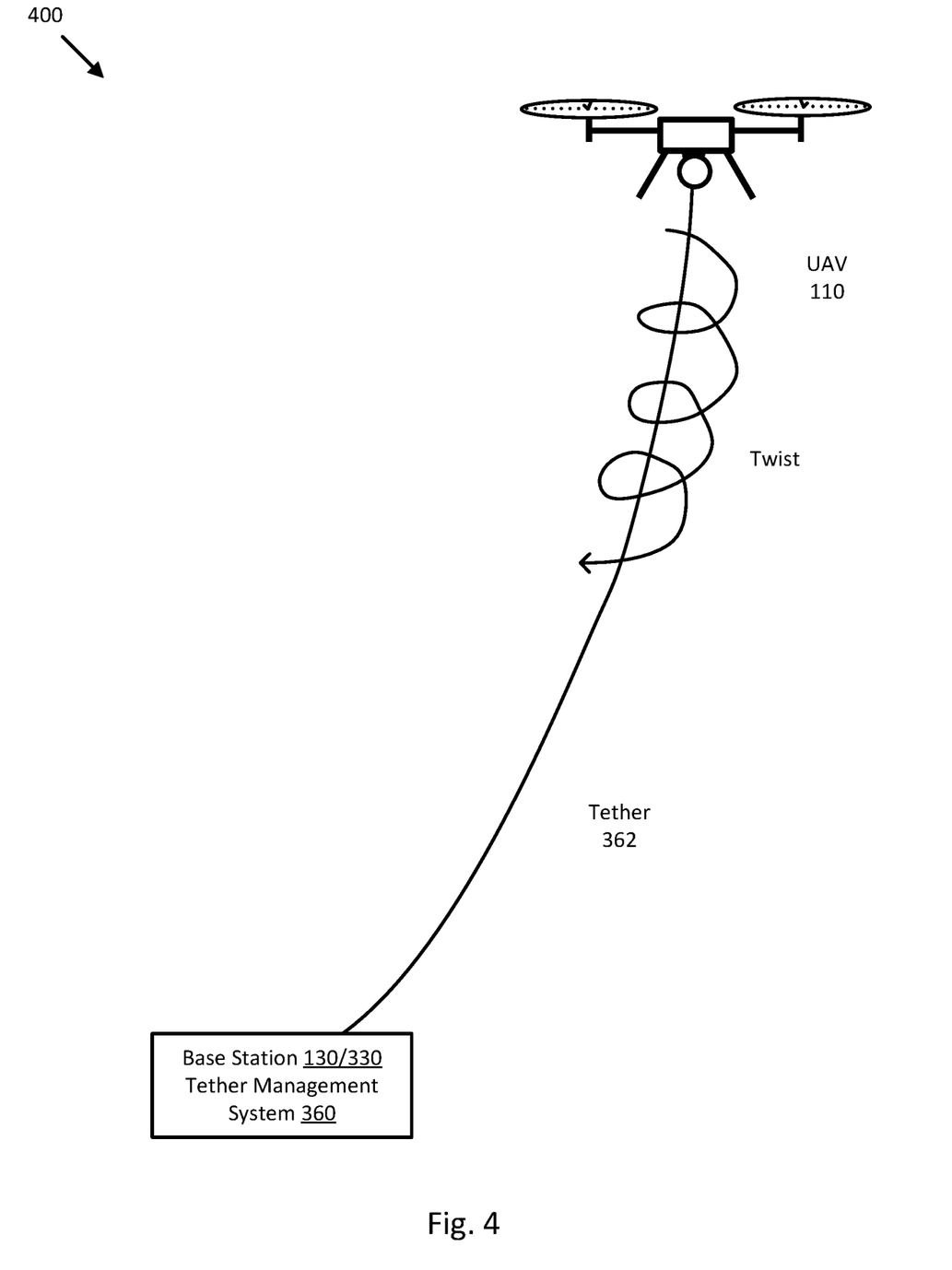
FIG. 4 illustrates a diagram of a UAS including a tethered UAV experiencing undesirable tether twisting in accordance with an embodiment of the disclosure.

For example, FIG. 4 illustrates a diagram of a UAS 400 including a tethered UAV 110 experiencing undesirable tether twisting in accordance with an embodiment of the disclosure. As shown in FIG. 4, UAS 400 includes UAV 110 tethered to base station 130/330 and/or tether management system 360 via tether 362. In addition, UAV 110 has yawed sufficiently in one direction to accumulate approximately 3.5 twists in tether 362.

To reduce the impact of such twisting on completion of a flight mission, the following issues should be addressed: typically, there is not a need to untwist tether 362 until the accumulated twist reaches or exceeds a preset maximum allowable accumulated twist; untwisting should be automated (e.g., to reduce the operational burden on an operator of UAS 400); under some circumstances, the operator of UAS 400 should decide when to initiate untwisting; at all times, the accumulated twist and the approach to the maximum allowable accumulated twist of tether 362 should be monitored by UAS 400 and provided to an operator of UAS 400 via a proper indicator and/or warning mechanism; before an untwisting process initiates, the heading of UAV 110 should be stored, and, where possible, UAV 110 should return to the stored heading upon completion of the untwisting process; when possible, tether 362 should be untwisted completely or as much as possible before UAV 110 is landed to eliminate twisting of tether 362 while tether 362 is spooled (e.g., untwisting could be initiated when UAV 110 is directed to land and to complete the untwisting before UAV 110 touches ground); and an initiated untwisting process should be haltable/cancelable by UAS 400 and/or an operator of UAS 400 at any time (e.g., for safety/exigent circumstances).

Figure 5:
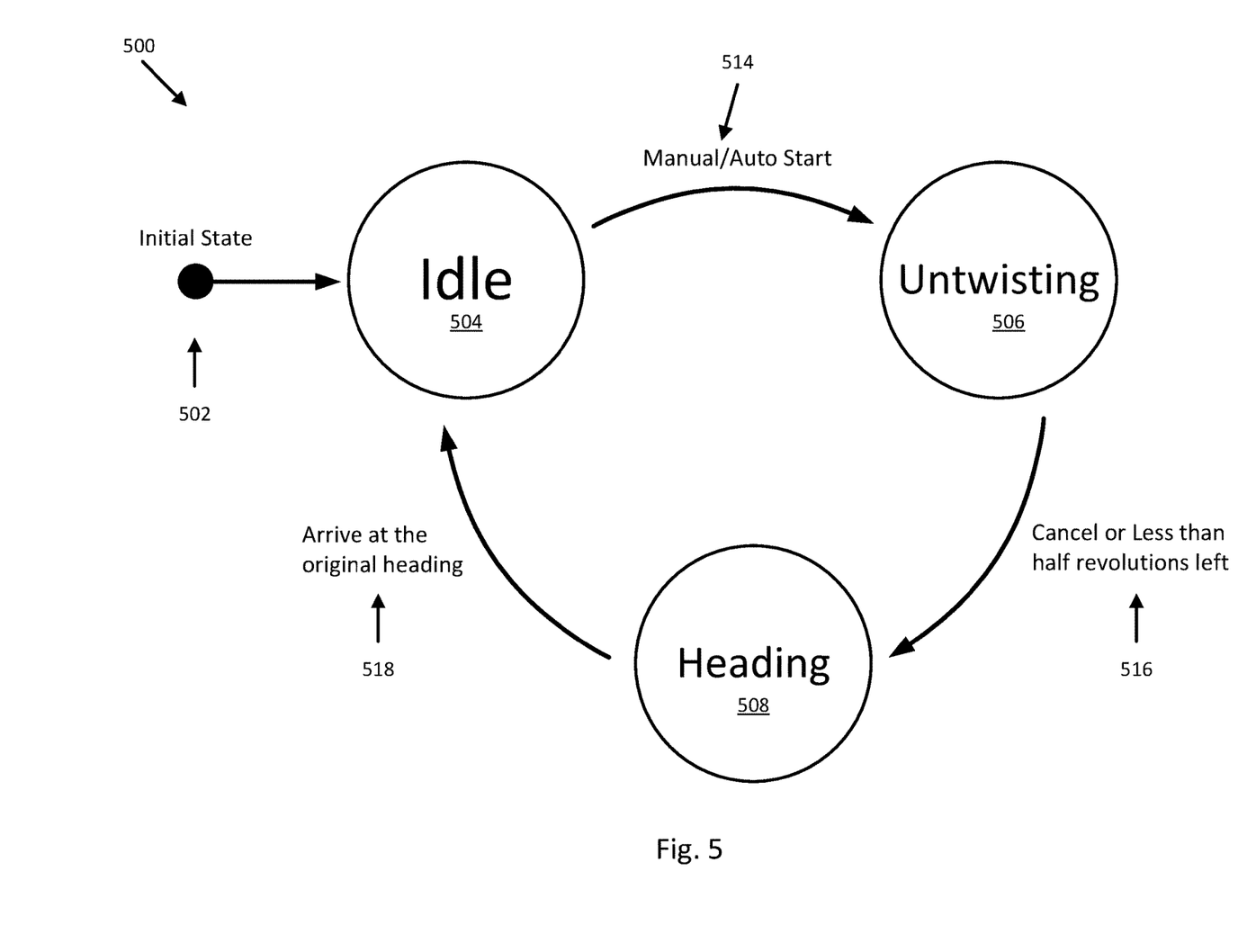
FIG. 5 illustrates a diagram of a state machines to provide tether management in accordance with an embodiment of the disclosure.

FIG. 5 illustrates a diagram of a state machine 500 to provide tether management in accordance with an embodiment of the disclosure. In the embodiment shown in FIG. 5, state machine includes an initial state 502, and three cyclic states: idle state 504, untwisting state 506, and heading state 508. Linking each one of the cyclic states are three state change operators: initiation operator 514, completion operator 516, and idle operator 518. Additional states and/or operators are contemplated, such as an emergency idle operator linking each of untwisting state 506 and heading state 508 to idle state 504 and bypassing the other states and/or operators shown in FIG. 5.

In general, manual starts and cancelations may be user input provided by an operator of systems 100/400, and auto start may be triggered when UAV 110 is directed to land, for example, or when the accumulated twist reaches and/or exceeds a maximum allowable accumulated twist. Untwisting state 506 may be configured to store a heading of UAV 110 prior to performing an untwisting process, which may include counteryawing UAV 110 as fast as possible to untwist tether 362, and heading state 508 may be configured to yaw UAV 110 to the stored heading, and so each state may use different control logic.

Key parameters of state machine 500 may include a maximum allowable twist or twist tolerance (unit: rev/m), which could be determined by bench test. One possible way to perform the bench test is to fix one end of tether 362 and spin the other end while transmitting power and/or data across tether 362 until any temporary or permanent performance issue appears. The maximum allowable twist may be determined by dividing revolutions spun (in causing the detected damage) by the length of the tested tether, and then optionally reducing that number by a tolerance percentage to account for non-uniform tether materials (e.g., 10%).

Another key parameter may include a maximum allowable accumulated twist or warning tolerance (unit: rev), which could be defined as the maximum allowable twist times the length of tether reeled out of tether management system 360. If the unspooled length of tether 362 is not accessible, UAV height AGL (Above Ground Level) could be used as a rough alternative, which may be provided by a differential flight altitude estimation system, as described in U.S. Patent Application No. 62/963,128, filed Jan. 19, 2020 and entitled FLIGHT ALTITUDE ESTIMATION SYSTEMS AND METHODS, which is hereby incorporated by reference in its entirety. Another key parameter may include a maximum untwisting speed (unit: rad/s), which could be defined as the maximum yaw speed of UAV 110, to estimate a minimum capable untwisting time.

In various embodiments, state machine 500 may be used to generate notifications to UAS 100/400 (e.g., an autopilot of UAS 100/400) and/or an operator of UAS 400 Communication. One such notification may include a message or trigger including an indication that tether 362 is twisted too much and a directive to untwist tether 362, such as rendering a tether damage warning message on a display of user interface 132, which may include "The tether is twisted too much, please unwind it," for example. Such notification may be generated upon monitoring an accumulated yaw (e.g., using orientation sensor 114), dividing an absolute value of the accumulated yaw by 360 degrees to determine an accumulated twist, and monitoring the accumulated twist relative to a maximum allowable accumulated twist.

Another such notification may include a message or trigger (e.g., delivered when transiting from idle state 504 to untwisting state 506) including an indication that the untwisting process has initiated, such as rendering a tether untwisting process initiation message on a display of user interface 132, which may include "Tether untwisting has started," for example. In some embodiments, initiation operator 514 may include a process to generate such notification. Another such notification may include a message or trigger (e.g., delivered when transiting from heading state 508 to idle state 504) including an indication that the untwisting process has completed, such as rendering a tether untwisting process completed message on a display of user interface 132 including "Tether untwisting is completed," for example. In some embodiments, completion operator 516 and/or idle operator 518 may include a process to generate such notification. In various embodiments, rendering such messages on a display of user interface 132 is the preferred way to deliver such notices to an operator, but any other proper way that make the operator and/or other elements of UAS 100/400 aware of the state transitions/situation are acceptable. As noted above, any start/cancel button(s) for tether untwisting should be easily accessible by an operator.

Figure 6:
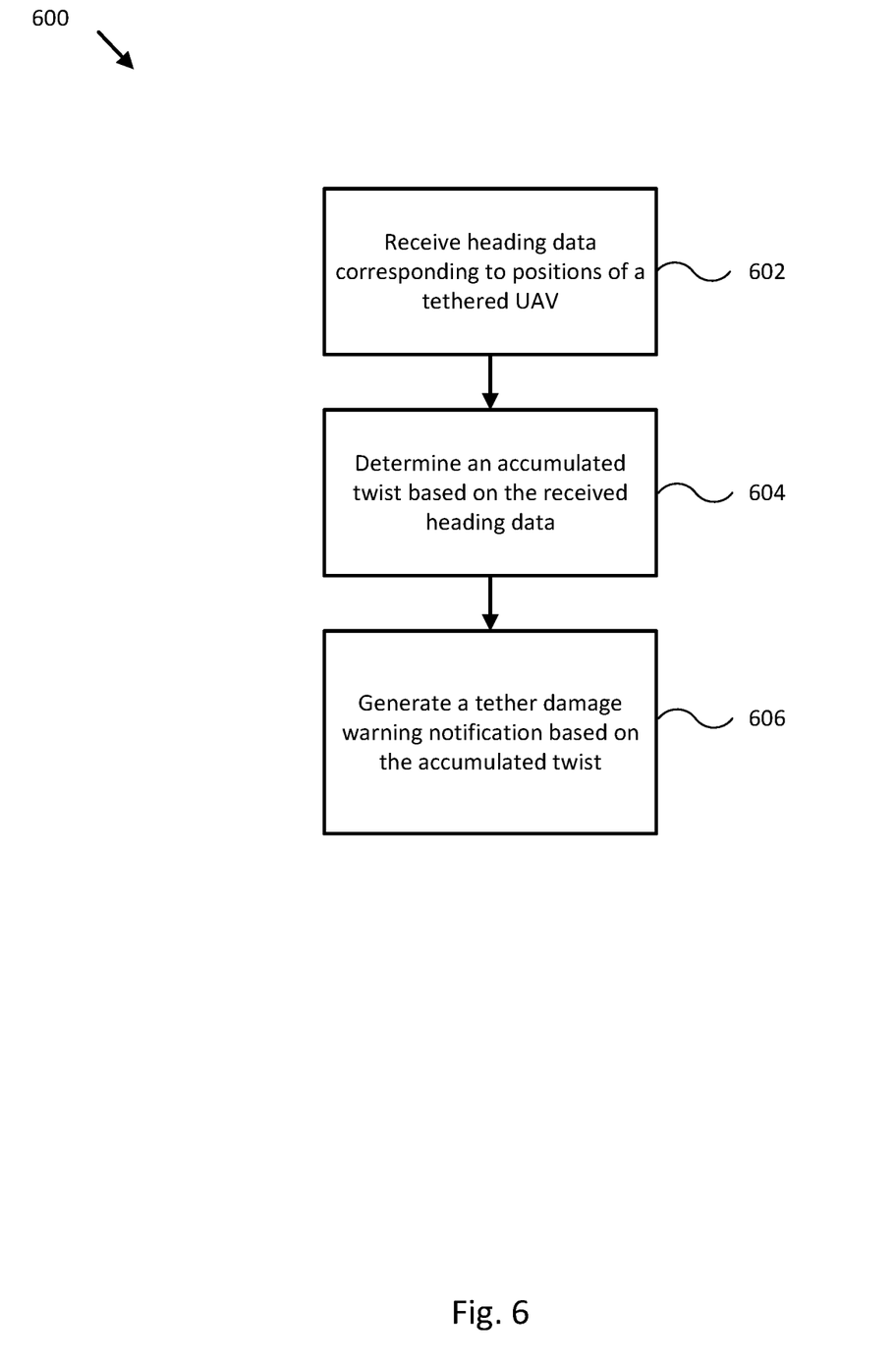
FIG. 6 illustrates a flow diagram of various operations to provide tether management in accordance with an embodiment of the disclosure.

FIG. 6 illustrates a flow diagram 600 of various operations to provide tether management using UASs 100 and/or 300 in accordance with an embodiment of the disclosure. In some embodiments, the operations of FIG. 6 may be implemented as software instructions executed by one or more logic devices or controllers associated with corresponding electronic devices, sensors, control loops, and/or structures depicted in FIGS. 1-5. More generally, the operations of FIG. 6 may be implemented with any combination of software instructions, mechanical elements, and/or electronic hardware (e.g., inductors, capacitors, amplifiers, actuators, or other analog and/or digital components). It should also be appreciated that any step, sub-step, sub-process, or block of process 600 may be performed in an order or arrangement different from the embodiment illustrated by FIG. 6. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 600 is described with reference to systems described in FIGS. 1-5, process 600 may be performed by other systems different from those systems and including a different selection of electronic devices, sensors, assemblies, mechanisms, platforms, and/or platform attributes.

At block 602, heading data is received. For example, controller 112, communication module 120, user interface 132, and/or communication module 132 may be configured to receive heading data from the orientation sensor corresponding to one or more positions of the tethered UAV within the survey area. At block 604, an accumulated twist is determined. For example, controller 112, communication module 120, user interface 132, and/or communication module 132 may be configured to determine an accumulated twist of a tether coupled between the base station and the tethered UAV, wherein the accumulated twist of the tether is based, at least in part, on the received heading data. In various embodiments, controller 112, communication module 120, user interface 132, and/or communication module 132 may be configured to determine an accumulated twist of a tether based on control signals used to maneuver the tethered UAV, for example, so as to compensate for sensor error associated with the orientation sensor, for example, or to compensate for wrap error associated with relatively fast yawing of the tethered UAV and/or a relatively slow update rate of a heading of the tethered UAV. In block 606, a tether damage warning notification is generated. For example, controller 112, communication module 120, user interface 132, and/or communication module 132 may be configured to generate a tether damage warning notification based, at least in part, on the determined accumulated twist and a maximum allowable accumulated twist associated with the tether coupled between the base station and the tethered UAV.

By providing such systems and techniques for tether management, embodiments of the present disclosure substantially improve the operational flexibility and reliability of unmanned sensor platforms. Moreover, such systems and techniques may be used to increase the operational safety of unmanned mobile sensor platforms above that achievable by conventional systems. As such, embodiments provide mobile sensor platforms systems with significantly increased survey convenience and performance.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A system comprising:
a logic device configured to communicate with a communication module and an orientation sensor coupled to a tethered unmanned aerial vehicle (UAV), wherein the communication module is configured to establish a communication link with a base station associated with the tethered UAV, the orientation sensor is configured to provide headings of the tethered UAV as it maneuvers within a survey area, and the logic device is configured to:
receive heading data from the orientation sensor corresponding to one or more positions of the tethered UAV within the survey area;
determine an accumulated twist of a tether coupled between the base station and the tethered UAV, wherein the accumulated twist of the tether is based, at least in part, on the received heading data; and
generate a tether damage warning notification based, at least in part, on the determined accumulated twist and a maximum allowable accumulated twist associated with the tether coupled between the base station and the tethered UAV.

2. The system of claim 1, wherein the logic device is configured to:
autopilot the tethered UAV to counteryaw the tethered UAV to reduce the accumulated twist of the tether coupled between the base station and the tethered UAV.

3. The system of claim 2, wherein the logic device is configured to:
generate a tether untwisting process initiation notification prior to the autopiloting the tethered UAV to reduce the accumulated twist of the tether.

4. The system of claim 2, wherein the logic device is configured to:
determine an initial heading of the tethered UAV prior to autopiloting the tethered UAV to reduce the accumulated twist of the tether; and
autopilot the tethered UAV to orient the tethered UAV according to the initial heading.

5. The system of claim 4, wherein the logic device is configured to:
generate a tether untwisting process completed notification subsequent to the autopiloting the tethered UAV to reduce the accumulated twist of the tether and/or subsequent to the autopiloting the tethered UAV to orient the tethered UAV according to the initial heading.

6. The system of claim 1, wherein the determining the accumulated twist of the tether comprises:

determining an accumulated yaw of the tethered UAV based on the received heading data corresponding to the one or more positions of the tethered UAV within the survey area; and
determining the accumulated twist of the tether as the absolute value of the accumulated yaw of the tethered UAV divided by 360 degrees.

7. The system of claim 1, wherein the logic device is configured to determine the maximum allowable accumulated twist prior to generating the tether damage warning notification, wherein the determining the maximum allowable accumulated twist comprises:
receiving an unspooled length of the tether from a tether management system of the base station;
retrieving a predetermined maximum allowable twist associated with the tether; and
determining the maximum allowable accumulated twist as the maximum allowable twist multiplied by the unspooled length of the tether.

8. The system of claim 1, wherein the logic device is configured to determine the maximum allowable accumulated twist prior to generating the tether damage warning notification, wherein the determining the maximum allowable accumulated twist comprises:
determining a flight altitude estimate of the tethered UAV;
retrieving a predetermined maximum allowable twist associated with the tether; and
determining the maximum allowable accumulated twist as the maximum allowable twist multiplied by the flight altitude estimate.

9. The system of claim 1, wherein:
the logic device is coupled to the tethered UAV; and
the tether damage warning notification is received from the base station over the communication link.

10. The system of claim 1, wherein:
the logic device is coupled to the base station; and
the tether damage warning notification is received from the UAV over the communication link.

11. A method comprising:
receiving heading data from the orientation sensor coupled to a tethered unmanned aerial vehicle (UAV) configured to provide headings of the tethered UAV as it maneuvers within a survey area, wherein the heading data corresponds to one or more positions of the tethered UAV within a survey area;
determining an accumulated twist of a tether coupled between a base station and the tethered UAV, wherein the accumulated twist of the tether is based, at least in part, on the received heading data; and
generating a tether damage warning notification based, at least in part, on the determined accumulated twist and a maximum allowable accumulated twist associated with the tether coupled between the base station and the tethered UAV.

12. The method of claim 11, further comprising:
autopilot the tethered UAV to counteryaw the tethered UAV to reduce the accumulated twist of the tether coupled between the base station and the tethered UAV.

13. The method of claim 12, further comprising:
generate a tether untwisting process initiation notification prior to the autopiloting the tethered UAV to reduce the accumulated twist of the tether.

14. The method of claim 12, further comprising:
determine an initial heading of the tethered UAV prior to autopiloting the tethered UAV to reduce the accumulated twist of the tether; and autopilot the tethered UAV to orient the tethered UAV according to the initial heading.

15. The method of claim 14, further comprising:
generate a tether untwisting process completed notification subsequent to the autopiloting the tethered UAV to reduce the accumulated twist of the tether and/or subsequent to the autopiloting the tethered UAV to orient the tethered UAV according to the initial heading.

16. The method of claim 11, wherein the determining the accumulated twist of the tether comprises:
determining an accumulated yaw of the tethered UAV based on the received heading data corresponding to the one or more positions of the tethered UAV within the survey area; and
determining the accumulated twist of the tether as the absolute value of the accumulated yaw of the tethered UAV divided by 360 degrees.

17. The method of claim 11, further comprising determining the maximum allowable accumulated twist prior to the generating the tether damage warning notification, wherein the determining the maximum allowable accumulated twist comprises:
receiving an unspooled length of the tether from a tether management system of the base station;
retrieving a predetermined maximum allowable twist associated with the tether; and
determining the maximum allowable accumulated twist as the maximum allowable twist multiplied by the unspooled length of the tether.

18. The method of claim 11, wherein further comprising determining the maximum allowable accumulated twist prior to the generating the tether damage warning notification, wherein the determining the maximum allowable accumulated twist comprises:
determining a flight altitude estimate of the tethered UAV;
retrieving a predetermined maximum allowable twist associated with the tether; and
determining the maximum allowable accumulated twist as the maximum allowable twist multiplied by the flight altitude estimate.

19. The method of claim 11, wherein:
the tether damage warning notification is received from the base station over a communication link established over the tether.

20. The method of claim 11, wherein:
the tether damage warning notification is received from the UAV over the communication link established over the tether.

* * * * *

UNITED STATES PATENT AND TRADEMARK OFFICE
CERTIFICATE OF CORRECTION

| | |
|---|---|
| PATENT NO. | : 11,423,790 B2 |
| APPLICATION NO. | : 17/148500 |
| DATED | : August 23, 2022 |
| INVENTOR(S) | : Fei Yu, Richard Cunha and Jerry Mailloux |

It is certified that error appears in the above-identified patent and that said Letters Patent is hereby corrected as shown below:

In the Specification

Column 1, Lines 23-24, change "patent application Ser. No." to --Patent Application No.--.

Column 1, Line 27, change "patent application Ser. No." to --Patent Application No.--.

Signed and Sealed this
Eleventh Day of October, 2022

Katherine Kelly Vidal
*Director of the United States Patent and Trademark Office*